United States Patent
Enns et al.

(10) Patent No.: US 12,287,754 B2
(45) Date of Patent: Apr. 29, 2025

(54) METHOD FOR PERFORMING A DATA TRANSMISSION USING ETHERNET AS A PHYSICAL LAYER WITH A NON-ETHERNET SERIAL PROTOCOL

(71) Applicant: Robert Bosch GmbH, Stuttgart (DE)

(72) Inventors: Andreas Enns, Kirchheim Am Neckar (DE); Florian Schrittwieser, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 23 days.

(21) Appl. No.: 18/334,941

(22) Filed: Jun. 14, 2023

(65) Prior Publication Data
US 2024/0054095 A1    Feb. 15, 2024

(30) Foreign Application Priority Data
Aug. 12, 2022 (DE) ...................... 10 2022 208 412.8

(51) Int. Cl.
*G06F 13/42*    (2006.01)
*G06F 13/28*    (2006.01)
*G06F 13/40*    (2006.01)

(52) U.S. Cl.
CPC .......... *G06F 13/4291* (2013.01); *G06F 13/28* (2013.01); *G06F 13/405* (2013.01); *G06F 13/4068* (2013.01)

(58) Field of Classification Search
CPC .... G06F 13/4291; G06F 13/28; G06F 13/405; G06F 13/4068
See application file for complete search history.

(56) References Cited

U.S. PATENT DOCUMENTS

| | | | | |
|---|---|---|---|---|
| 2010/0118894 A1* | 5/2010 | Aweya | .................... | H03L 7/089 370/503 |
| 2011/0019681 A1* | 1/2011 | Gazier | .................. | H04J 3/0638 370/503 |
| 2012/0134428 A1* | 5/2012 | Bobrek | .................... | H04B 3/00 375/257 |

FOREIGN PATENT DOCUMENTS

| | | |
|---|---|---|
| DE | 10153085 A1 | 5/2003 |
| DE | 102006019305 A1 | 10/2007 |

\* cited by examiner

*Primary Examiner* — David E Martinez
(74) *Attorney, Agent, or Firm* — NORTON ROSE FULBRIGHT US LLP; Gerard A. Messina

(57) ABSTRACT

A method for performing a data transmission between a control device and an electronics unit. A microcontroller and an Ethernet transceiver are provided in the control unit, and a microcontroller and an Ethernet transceiver are also provided in the electronics unit. For data transmission, the two Ethernet transceivers are first synchronized, taking into account a common clock cycle, and, for data transmission, an Ethernet connection is used as a physical route, and the data transmission is carried out with a serial protocol.

15 Claims, 4 Drawing Sheets

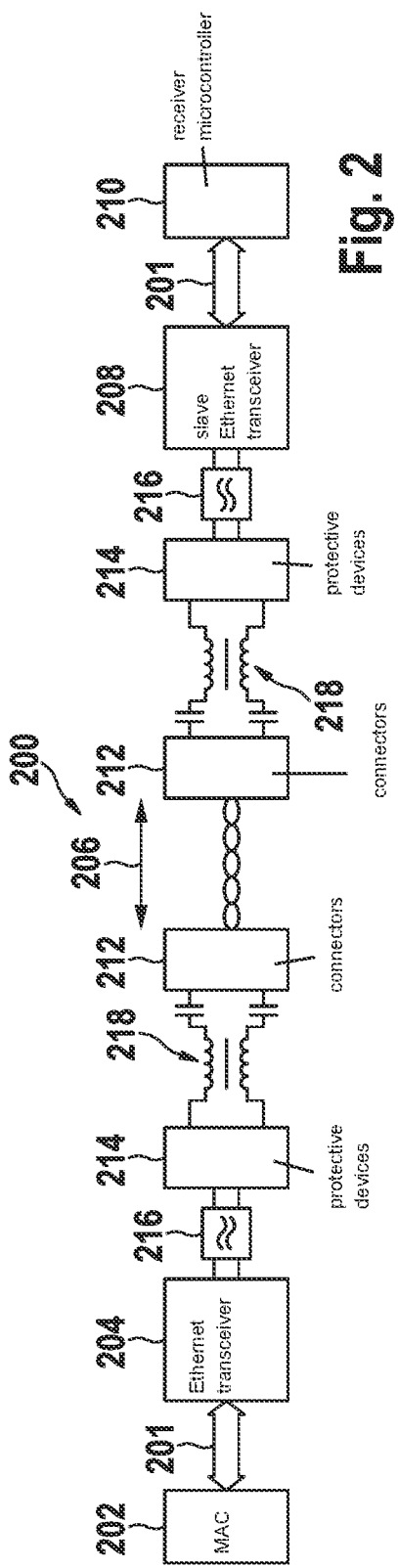
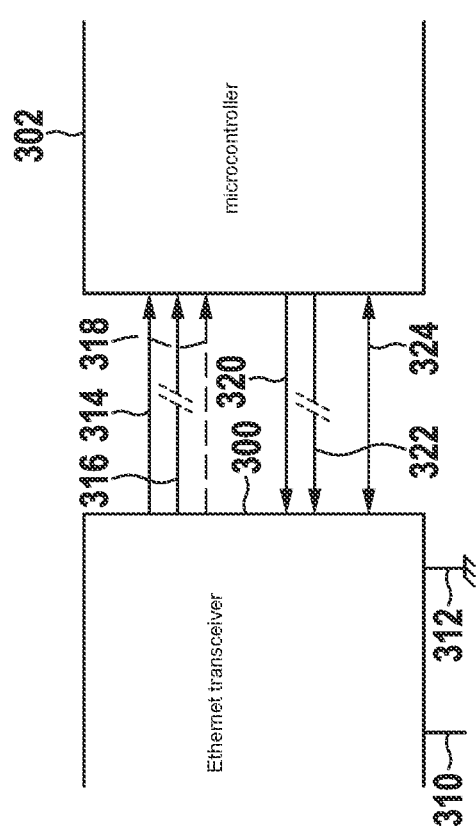

METHOD FOR PERFORMING A DATA TRANSMISSION USING ETHERNET AS A PHYSICAL LAYER WITH A NON-ETHERNET SERIAL PROTOCOL

CROSS REFERENCE

The present application claims the benefit under 35 U.S.C. § 119 of German Patent Application No. DE 10 2022 208 412.8 filed on Aug. 12, 2022, which is expressly incorporated herein by reference in its entirety.

FIELD

The present invention relates to a method for performing a data transmission between a control device and an electronics unit, as well as such a control device.

BACKGROUND INFORMATION

Control devices are electronics modules which are used at different locations in technical devices, such as motor vehicles, for the purpose of controlling and/or regulating technical processes and components. In current motor vehicles, a plurality of control devices is installed, on which high demands are made with regard to security or safety, at least in some cases.

German Patent Application No. DE 10 2006 019 305 A1 describes a method for data transmission from and to a control device—in particular an engine control unit—which has a first communications interface and a second communications interface. In the method, it is provided that, during the development phase of the control device, the first communications interface be connected to a development tool and the second communications interface to one or more functional units.

It should be noted that modern control devices, in particular in motor vehicles, also require larger and larger memory elements due to their ever-increasing number of functions. Here, for example, flash memories are used for programs and data. These memories must be programmed during the production process in the factories, during end-of-line programming at the vehicle manufacturers, and, if necessary, also in workshops in the field.

Data to be programmed can be transmitted to the control device, for example, via a serial interface, which is otherwise used for transmitting diagnostic information.

This means that, during inspection at the manufacturing plant, during flashing, or in analysis in the case of returns, there must be a data exchange with the installed controller via existing communications channels of the control device—for example in an SoC (system on a chip). These communications channels can consist of different bus systems.

Each of these bus systems has a separate protocol which must be implemented on both sides of the communication. As a result, the test software with the associated protocol driver layers can be used only for one bus system. The data rate is also predetermined by the bus system in question.

German Patent No. DE 101 53 085 A1 describes a method for programming a control unit, wherein the control unit can be connected via a communications interface to an external programming unit. An internal communications link connects the communications interface to a control unit, which in turn has a programming element and a communications element. Furthermore, a switching means (i.e., a switch) is provided, by means of which the communications connection is switched between the programming element and the communications element. The communications link is a CAN connection (CAN: controller area network). A CAN driver circuit is connected into the communications link between the communications interface and the control unit.

SUMMARY

A method and a control device for performing a data transmission are provided according to the present invention. Example embodiments of the present invention are disclosed herein.

The method provided according to an example embodiment of the present invention serves to perform a data transmission between a control device and an electronics unit, wherein, in the control device, a microcontroller, SoC or SiP, and an Ethernet transceiver are provided, and, in the electronics unit, a microcontroller, SoC (system on a chip) or SiP (system in package), and an Ethernet transceiver are also provided. For data transmission, the two Ethernet transceivers are first synchronized, taking into account a common clock cycle. Furthermore, an Ethernet connection is used as a physical route for data transmission. The data transmission takes place with a serial protocol.

The method provided according to the present invention thus serves to perform a data transmission between a control device and an electronics unit, wherein a bidirectional data transmission is possible. Data can thus be transmitted from the electronics unit to the control device. In addition, data can be transmitted from the control device to the electronics unit.

The physical route is given by the lowest layer of the OSI model. The data transmission typically takes place via a communications link, namely via the lines in the Ethernet transceiver, referred to as MDI_TRX_Minus and MDI_TRX_Plus.

In the method provided according to the present invention, the corresponding protocols of the individual bus systems are thus dispensed with, these systems being used only as a physical transmission route. In this way, a uniform protocol, in particular ASC (asynchronous serial communication), can be used on all systems. This procedure is also referred to herein as ASC@Ethernet. Asynchronous serial communication is understood to mean serial communication in which the data packets of the communicating end points are not continuously synchronized by a common clock signal.

As a result of the method according to the present invention, the sometimes significant overhead of the bus protocols can be saved upon, this consisting largely of addressing, bit stuffing, and so on. Since only a point-to-point connection is provided in typical applications, in particular in conjunction with a tester control device or a tester ECU (ECU: electronic control unit), addressing can be dispensed with.

Furthermore, bit stuffing is not required, since, due to transmission according to the UART standard (UART: universal asynchronous receiver/transmitter), a synchronization takes place after each byte. An extremely simple transmission protocol, such as xKWP, with a 4-byte overhead, is sufficient to ensure freedom from error in the communication. UART defines a protocol for exchanging serial data between two units.

In the method provided according to an example embodiment of the present invention, the following can be provided:

The Ethernet bus system with its associated hardware (transceiver) is used only as a physical route.

By dispensing with the bus system's own protocol, a pure UART communication (ASC) can be used on this route.

There are standardized code shares for all projects or customers within the projects, since, irrespective of the physical route, the same protocol is always used, such as CAN, FlexRay, or Ethernet.

Furthermore, it should be noted that all common Ethernet bus systems or their physical layers are regarded as variants.

The control device described is configured to carry out a method of the type described herein. For this purpose, the control device regularly has a microcontroller, SoC or SiP, and an Ethernet transceiver. Furthermore, it typically has a (communications) interface required for the data transmission.

Further advantages and embodiments of the present invention can be found in the description and the figures.

Of course, the features mentioned above and those still to be explained below can be used not only in the respectively specified combinations, but also in other combinations or alone, without departing from the scope of the present invention.

BRIEF DESCRIPTION OF THE DRAWINGS

FIG. 2 shows the entire transmission path from a microcontroller, via an Ethernet transceiver, to the partner, which also has an Ethernet transceiver and a microcontroller.

FIG. 3 shows an Ethernet transceiver and a microcontroller, between which a data transmission takes place.

DETAILED DESCRIPTION OF EXAMPLE EMBODIMENTS

Figure 1:
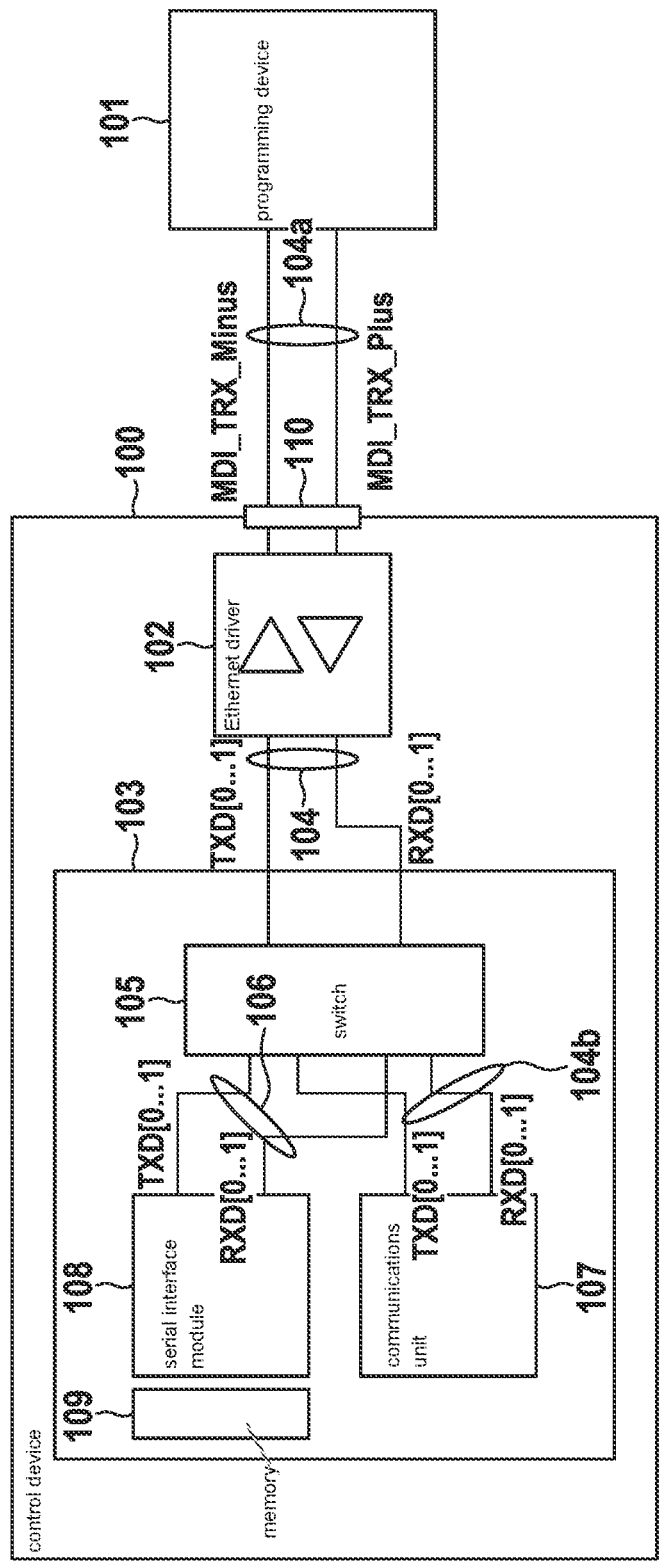
FIG. 1 shows a block diagram of a control device with an electronics unit for carrying out an example embodiment of the described method of the present invention.

The present invention is represented schematically in the drawings on the basis of embodiments and is described below with reference to the figures.

FIG. 1 shows a control device 100 and a programming device 101. The control device 100 has a communications interface 110 to the outside, to which a communications link 104 with the lines RXD[0 . . . 1] TXD[0 . . . 1] is connected internally. A driver element, in particular an Ethernet driver 102, which makes possible a bidirectional connection with the desired levels to the communications interface 110, is connected into this communications link 104, i.e., the two lines TXD and RXD. The external lines, i.e., the communications link to the outside 104A, are referred to as MDI_TRX_Minus and MDI_TRX_Plus. The programming device 101 can be connected to the control device 100 via this external communications link 104A.

A control unit 103, e.g., a microprocessor or a microcomputer, is contained in the control device 100. This comprises a communications unit 107, which in this example corresponds to an Ethernet controller. Also included in the microprocessor 103 is a serial interface module 108, e.g., an asynchronous serial communications interface ASC, via which data for programming the memory 109, which is in particular also integrated into the microprocessor, can be received or transmitted. In addition, communication can be ensured via the interface module 108. The memory can also be located outside the control unit 103 and is preferably designed as a flash memory.

The illustration further shows a switching means (i.e., a switch) 105 in which, in particular, a program-controlled interface changeover switch or a multiplexer is provided, which enables a switching of the communications link from the communications unit 107 to the interface module 108.

For all control devices or SoCs, which make it possible to switch from Ethernet to ASC SoC-internally on the pins TXD/RXD, the switching means 105 can be omitted. The switching in the control device 100 then takes place with software—in the case shown for ASC@Ethernet. If the installed SoC does not make it possible to switch over ASC and Eth, such a switching means 105 will be required.

In the context of normal communication, in particular in the control device network in the vehicle, the connection to the Ethernet driver 102 and to the Ethernet interface 110 from the communications unit or from the Ethernet controller 107 is present via communications link sections 104B, switching means or interface changeover switch 105, and communications link 104, and a conventional data transmission takes place in the context of Ethernet communication, i.e., in this case, a first bus protocol, in particular the Ethernet bus protocol, is used.

If the control device 100 is to be programmed or communicated in the test mode, for this purpose, the control device 100 will be connected via 104A to the programming device 101. The interface changeover switch 105 then makes the connection to the interface module 108 via the connection section 106. As a result, the communications interface 110, the Ethernet driver 102, and the communications link 104 to the microprocessor can also be used for the programming or test mode communication. However, a second bus protocol is used here for programming, in particular a standard protocol of a serial interface, such as, for example, RS-232.

FIG. 2 shows the transmission path 200 from a microcontroller (MAC) 202, to an Ethernet transceiver 204, per RMII 201, via UTP 206, which represents a physical route between Ethernet transceivers, to a slave Ethernet transceiver 208, to a receiver microcontroller 210. The transmission takes place via connectors 212 and protective devices 214, a low-pass filter 216, and EMC filters 218.

FIG. 3 shows an Ethernet transceiver 300 and a microcontroller 302, between which a data transmission takes place. The illustration clarifies in particular the PIN assignment which is corresponding for both units 300 and 302. The illustration shows:

X0 310,
XI 312,
CRSDV 314,
RXD[1:0] 316,
RXER 318,
TXEN 320,
TXD[1:0] 322,
REF_CLK 324.

Furthermore, a clock cycle in a range from 9.5 to 50 MHz is provided on REF_CLK 324. The pins RXER 318, CRSDV 314 are not used here.

Figure 4:
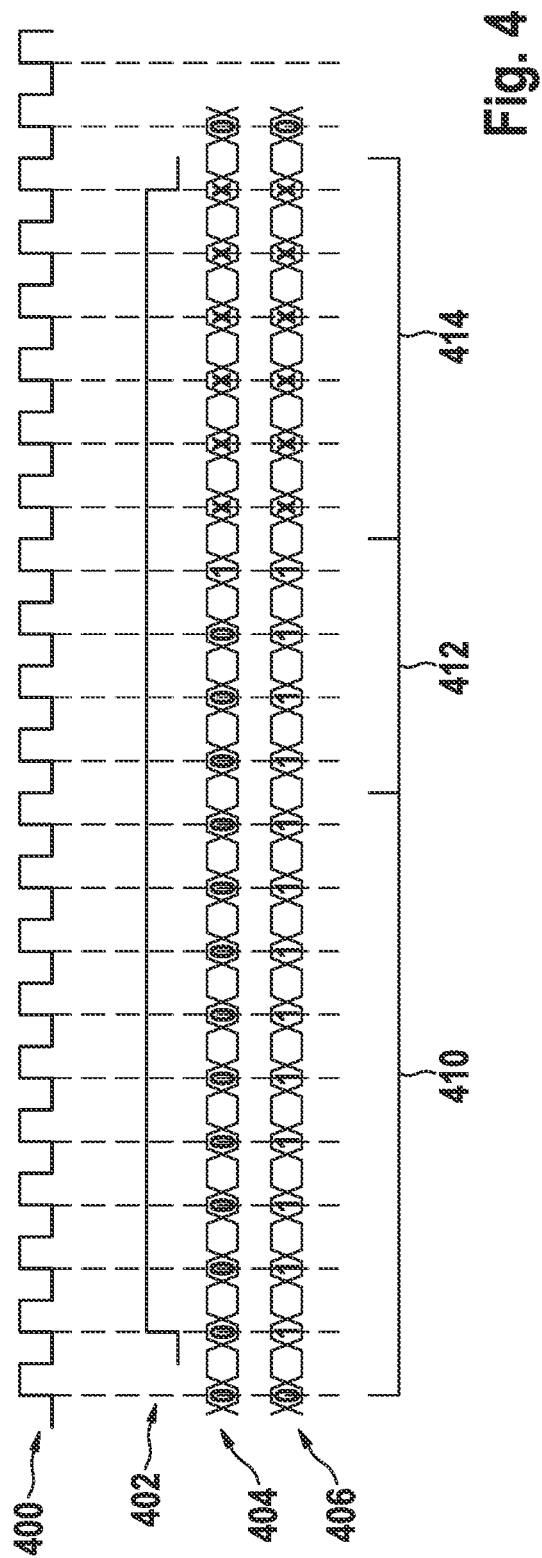
FIG. 4 shows a data sequence which is transmitted between a control device and an electronics unit, according to an example embodiment of the present invention.

FIG. 4 shows data sequences in the context of the transmission, namely REF_CLK 400, TX_EN 402, TXD[1] 404, and TXD[0] 406. The data sequences are divided into three sections, namely preamble 410, SFD 412 (start frame detection), and data 414.

Figure 5:
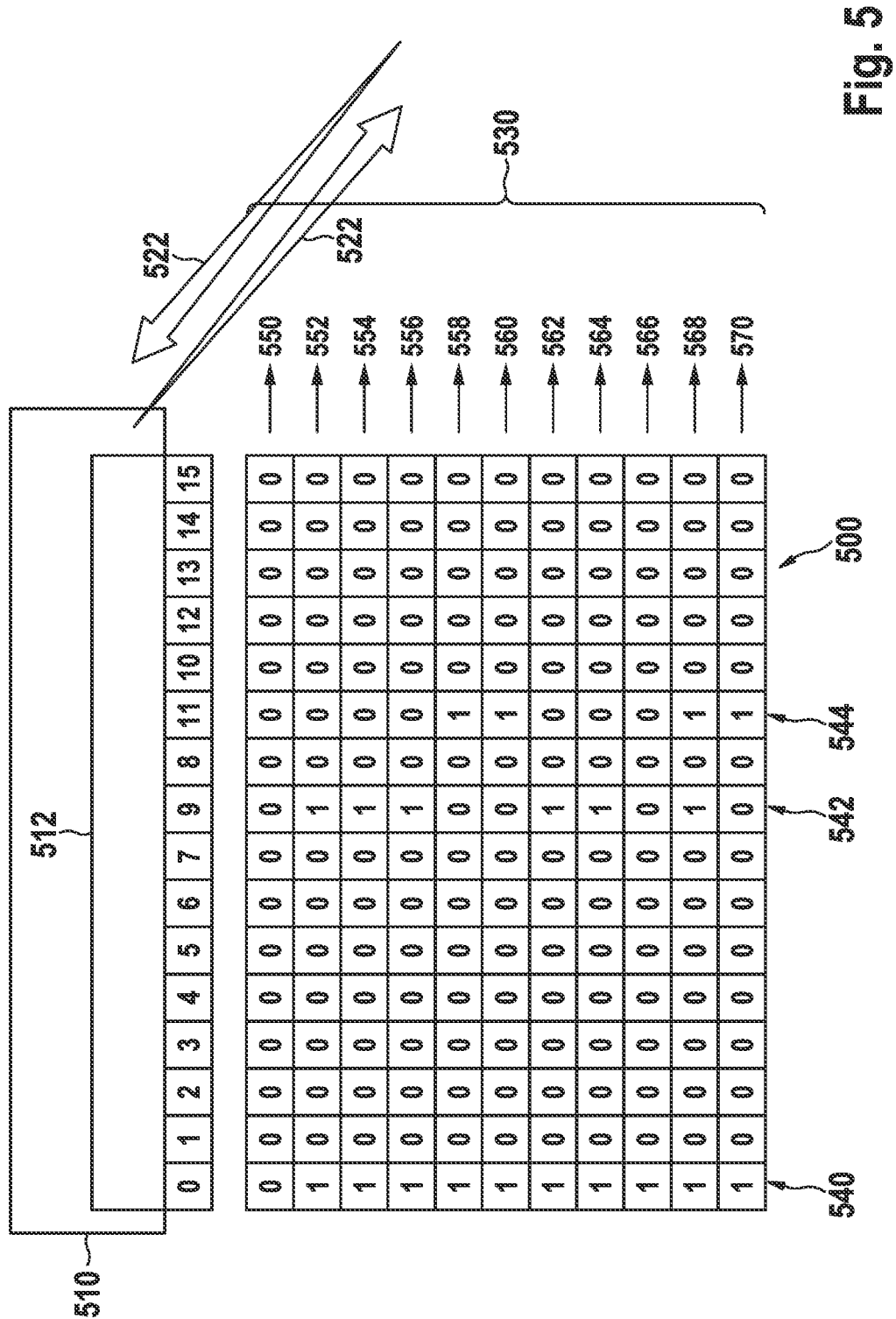
FIG. 5 shows a DMA buffer.

FIG. 5 shows a DMA buffer (DMA: direct memory access) 500. The illustration shows an MCU 510 and a GPIO port 512. A first arrow 520 shows the effective flow during the reception or reading of data, and a second arrow 522 shows the effective flow during the transmission or writing of data.

Furthermore, a brace 530 indicates register [0] through register [70]. A column 540 contains the data of TXD1=TXEN, another column 542 the data of the clock signal, and yet another column 544 the data of TXD0. Reference numerals 550 through 570 denote the individual registers.

The method is explained in more detail with reference to the figures:

On the tester and ECU side, after the Ethernet bus transceivers, the controller/SoC is not configured onto the corresponding bus system, but TX and RX pins are configured as ASC, and the clock cycle rate is changed in the direction of the Ethernet bus transceiver; see in this regard FIG. 3.

To simplify the transmission, the data lines TXEN, TXD0 are combined, identical data content being transmitted here. This is possible, since TXEN is always 1 during the transmission, and, on TDX0, the preamble, SFD, and the data section are also specified as 1. In the data transmission, useful information is thus carried out only on TXD1. During the transmission of data, the pin TXEN is set to 1. If data transmission has ended, TXEN and TXD0 will be set to 0, and transmission is thus terminated; see FIG. 4.

The aim is to establish a stable communication of boundary conditions specified for an Ethernet transceiver, namely via a physical route from microcontroller 1 on the receiving side to microcontroller 2 on the opposite side (MAC); see FIG. 2.

For this purpose, RMII mode with an external clock source is used. By means of the microcontroller, the clock cycle signal from 9.5 to 50 MHz, which is transmitted from the source to be transmitted—the microcontroller—to the receiving side—the Ethernet transceiver—is generated using a PWM pin. RMII is a more compact version of the media-independent interface (MII) that requires fewer hardware pins than MII and is used for communication between transceivers and MAC.

Before the transmission, the data for the transmission are stored in the memory. The pins TXEN, TXD0, TXD1 and a clock cycle are required for the communication. The data transmission takes place with the aid of a DMA-based data access which puts the data from the memory onto the three hardware pins TXEN, TXD0, and TXD1 in parallel with and synchronously with the clock cycle. The data to be transmitted are stored in the data section of the transmission sequence. In this regard, reference is made to FIG. 5.

The transmission sequence of the data starts by applying a clock pulse of 9.5 to 50 MHz between the microcontroller and the Ethernet transceiver on the transmitting side. If the Ethernet transceiver—the master—has successfully synchronized with the second Ethernet transceiver on the receiving side—the slave Ethernet transceiver—a so-called link-up will take place, this information being retrievable in a status register of the master Ethernet transceiver.

The transmission sequence starts with the application of a TXEN+TXD1 signal of 1. After the start of the transmission, the preamble is transmitted. This is expressed as 6 bits of 0 on TXD1, then, in SFD, 4 bits of 1, then the data follow. For TXD0, this is expressed as 6 bits of 1, then, in SFD, one bit of 1, then the data follow, which are simply identical to the value of TXEN 1; see FIG. 4.

On the receiving side, i.e., the slave Ethernet transceiver, the microcontroller must be connected to the same clock frequency of 9.5 to 50 MHz. By means of a DMA access from the hardware pins RXD0 and RXD1 to the memory, the data is secured with a subsequent evaluation. With the same approach as described above, a response is sent back.

A sequence is started on the SoC, SiP, or microcontroller, on the receiving side and on the transmitting side, which sequence manages the reception and processing of the data and ensures the consistency thereof. Here, DMA technology, among other things, is also used, which provides the SoC/SiP/microcontroller; see FIG. 5.

This type of communication can be used on all control devices in which a data exchange takes place over the route of an Ethernet bus system.

What is claimed is:

1. A method for performing a data transmission between a control device and an electronics unit, the method comprising the following steps:
providing a microcontroller and an Ethernet transceiver in the control device, and also providing a microcontroller and an Ethernet transceiver in the electronics unit; and
for a first data transmission:
synchronizing the Ethernet transceiver in the control device and the Ethernet transceriver in the electronics unit, taking into account a common clock cycle; and
after the synchronizing, using an Ethernet connection as a physical route and performing the data transmission with a serial protocol;
wherein the method includes at least one of the following five features (I)-(V):
(I) the first data transmission occurs in a first mode in which the serial protocol is used instead of an Ethernet protocol, and the method further comprises switching from the first mode to a second mode to perform a second data transmission that uses the Ethernet protocol over the Ethernet connection;
(II) for the first data transmission, pins TXEN and TXD0 are combined, and identical data content is transmitted so that, during the first data transmission, useful information is executed only on pin TXD1, and a pin TXEN (TX enable) is set to 1;
(III) the pins TXEN and TXD0 are set to 0 at an end of the first data transmission;
(IV) the first data transmission is carried out using a Direct Memory Access (DMA)-based data access; and
(V) in the first data transmission, a data sequence, which is divided into three successive sections including a preamble, a SFD (start frame detection), and a data section, is transmitted.

2. The method according to claim 1, wherein the first data transmission is used for programming the control device.

3. The method according to claim 1, wherein, for the first data transmission, the pins TXEN and TXD0 are combined, and the identical data content is transmitted so that, during the first data transmission, useful information is executed only on pin TXD1, and the pin TXEN (TX enable) is set to 1.

4. The method according to claim 3, wherein the pins TXEN and TXD0 are set to 0 at the end of the first data transmission.

5. The method according to claim 1, wherein the pins TXEN and TXD0 are set to 0 at the end of the first data transmission.

6. The method according to claim 1, wherein the first data transmission is carried out using the DMA-based data access.

7. The method according to claim 1, wherein, in the first data transmission, the data sequence, which is divided into the three successive sections including the preamble, the SFD (start frame detection), and the data section, is transmitted.

8. The method according to claim 1, wherein the first data transmission occurs in the first mode in which the serial protocol is used instead of the Ethernet protocol, and the method further comprises the switching from the first mode to the second mode to perform the second data transmission that uses the Ethernet protocol over the Ethernet connection.

9. The method according to claim 8, wherein the switching includes switching between a communications unit for the second mode and an interface module for the first mode, and the switching is effected by software or a switch.

10. The method according to claim 8, wherein the first mode is used for programming the control device and the second mode is used for data communications of the control device during operations of the control devices that are performed according to the programming.

11. The method according to claim 8, wherein the switching includes switching from transmission over first communication link lines over which transmissions occur using the serial protocol to transmission over second communication link lines over which transmissions occur using the Ethernet protocol.

12. A control device configured to perform a data transmission with an electronics unit, the control device comprising:
 a microcontroller; and
 an Ethernet transceiver;
 wherein the control device is configured to, for a first data transmission:
  synchronize the Ethernet transceiver in the control device and the Ethernet transceiver in the electronics unit, taking into account a common clock cycle; and
  after the synchronizing, use an Ethernet connection as a physical route and perform the data transmission with a serial protocol;
 wherein the control device includes at least one of the following five features (I)-(V):

(I) the control device is configured for the first data transmission to occur in a first mode in which the serial protocol is used instead of an Ethernet protocol, and to switch from the first mode to a second mode to perform a second data transmission that uses the Ethernet protocol over the Ethernet connection;
(II) for the first data transmission, pins TXEN and TXD0 are combined, and identical data content is transmitted so that, during the first data transmission, useful information is executed only on pin TXD1, and a pin TXEN (TX enable) is set to 1;
(III) the pins TXEN and TXD0 are set to 0 at an end of the first data transmission;
(IV) the first data transmission is carried out using a Direct Memory Access (DMA)-based data access; and
(V) in the first data transmission, a data sequence, which is divided into three successive sections including a preamble, a SFD (start frame detection), and a data section, is transmitted.

13. The control device according to claim 12, further comprising:
 an interface module and a communications unit;
 wherein:
  the control device is configured for the first data transmission to occur in the first mode in which the serial protocol is used instead of an Ethernet protocol, and to switch from the first mode to the second mode to perform the second data transmission that uses the Ethernet protocol; and
  the switching includes switching between the interface module for the first mode and the communications unit for the second mode.

14. The control device according to claim 13, wherein software is stored which is configured for switching between the interface module and the communications unit.

15. The control device according to claim 13, further comprising:
 a switch configured to switch between the interface module and the communications unit.

* * * * *